June 24, 1952 — W. D. SCHMIDT — 2,601,330
LAYOUT DEVICE
Filed April 25, 1946 — 2 SHEETS—SHEET 1
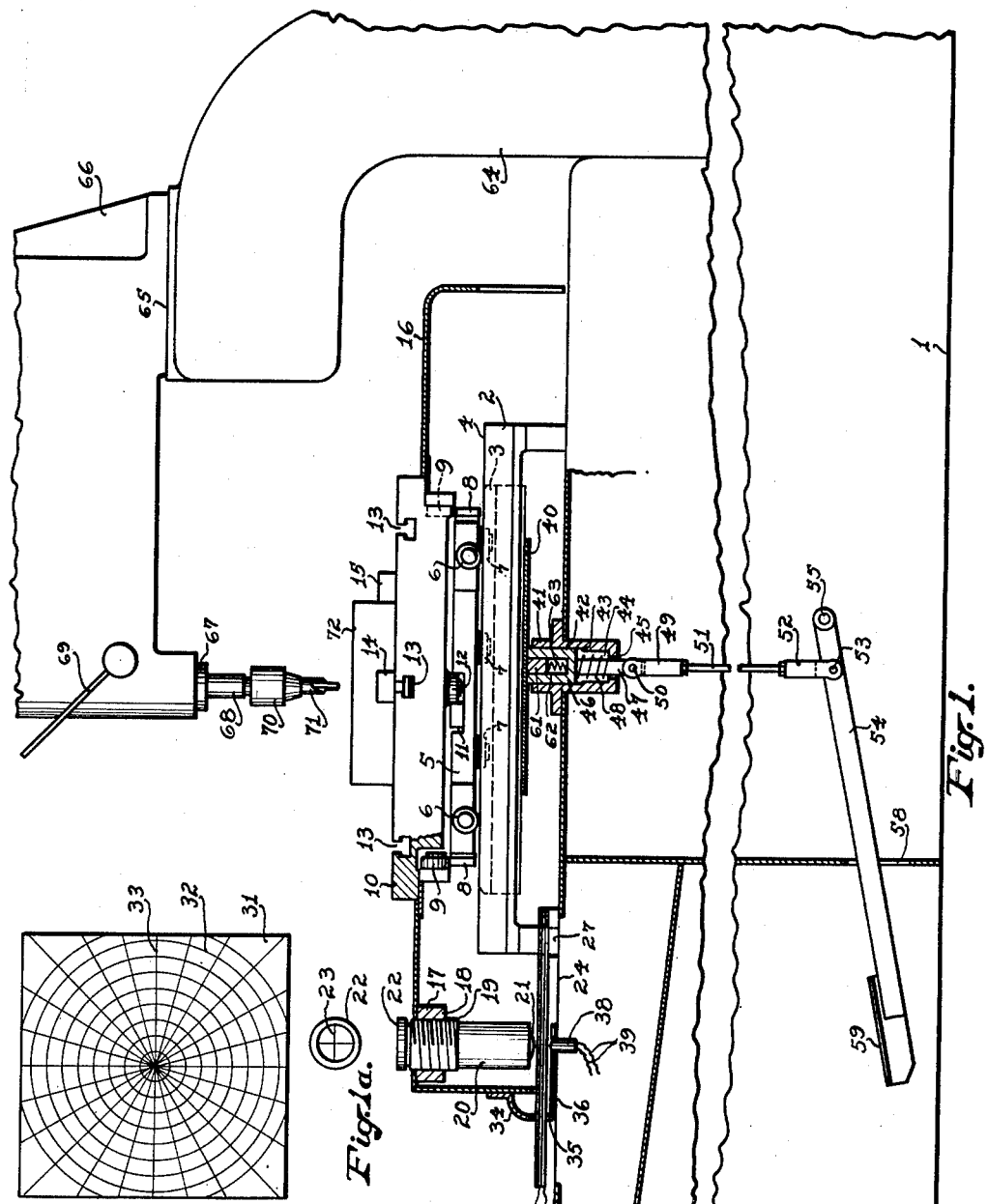
Fig.1.
Fig.1a.
Fig.4.
Inventor
William D. Schmidt
By Chas. H. Richards
Attorney

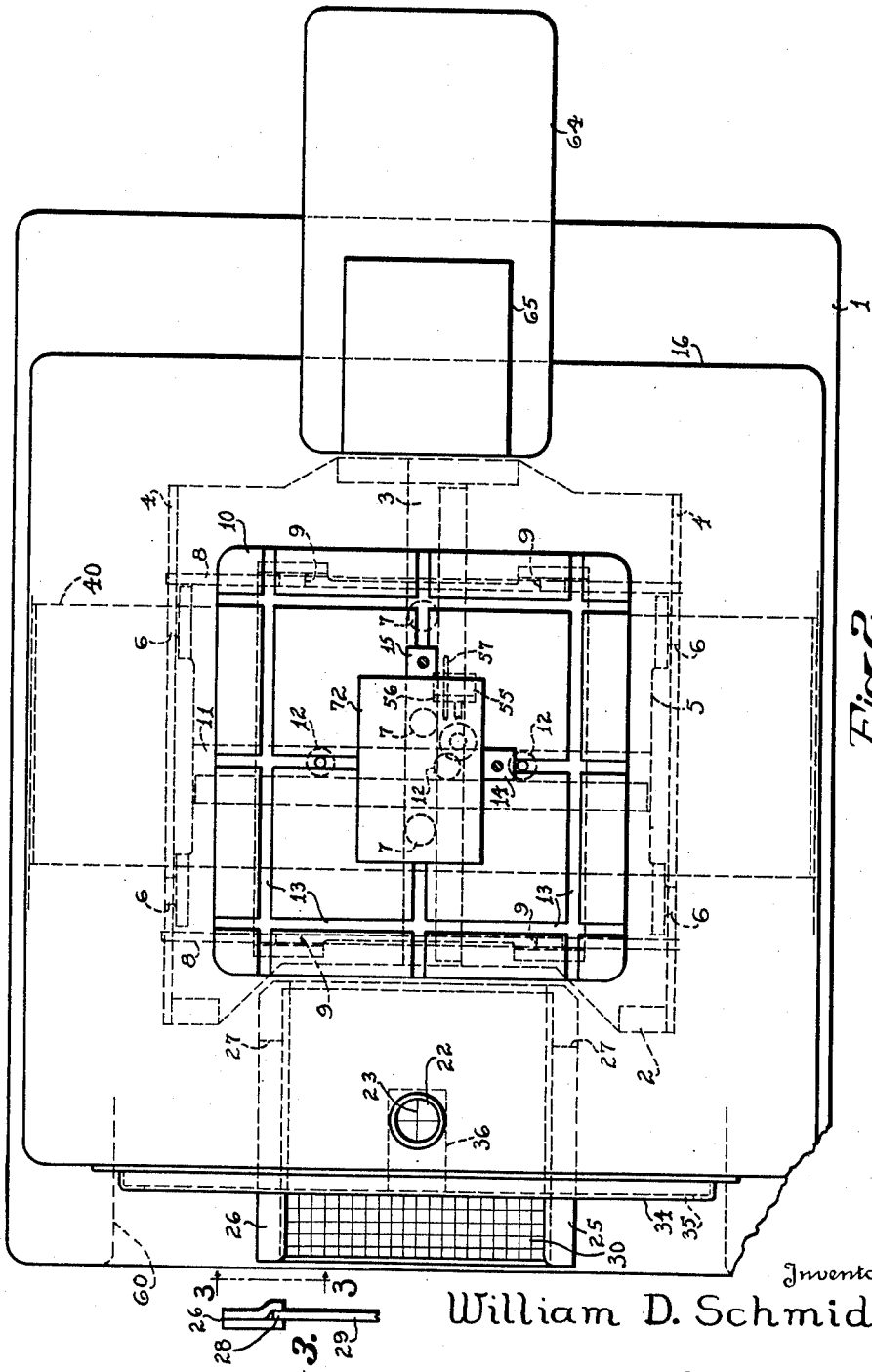

Patented June 24, 1952

2,601,330

UNITED STATES PATENT OFFICE 2,601,330

LAYOUT DEVICE

William D. Schmidt, Worcester, Mass., assignor, by mesne assignments, to Leland-Gifford Company, Worcester, Mass., a corporation of Massachusetts Application April 25, 1946, Serial No. 664,737

8 Claims. (Cl. 33—189)

In manufacturing plants, especially machine shops and tool rooms, there is always the recurring problem of laying out the location of a number of holes in a part to be drilled. This requires considerable time on the part of the layout man or machine operator and particularly when there are a number of parts or workpieces having identical dimensions, inasmuch as each part must be handled individually.

The standard practice, used by layout men in manufacturing plants, tool shops and tool rooms, is to locate the center of one hole in relation to designated points of the workpiece and then scribe is center lines. This center is then used as the zero position from which all the other holes are spaced. The spacing of the holes from the zero position is done by the use of measuring instruments such as scales, height gages and scribers for marking the position of the center lines of the holes both vertically and horizontally. After the center lines are scribed it is necessary to mark the exact point where the center lines cross by means of a prick punch and then to draw a circle the size of the hole with a pair of dividers.

The above method requires a skilled mechanic and many times the prick punch mark is not exactly at the point of intersection of the center lines, or the prick punch is not held exactly perpendicular to the surface to be drilled and this causes the drill to start the hole away from the center it should be on. The operator drilling the hole starts the drilling operation slowly and by watching the circle above mentioned he can judge that the drill is running off. This running off can be corrected but it is a time consuming operation that does not always produce accurate results as far as the spacing between the holes is concerned.

It does not pay to make special jigs and fixtures for jobs where there are only small quantities of duplicate workpieces to be drilled as the cost of the jig would be prohibitive in comparison with the normal cost of production of the workpieces.

To reduce the liability of error, in laying out the positions of the holes, from piece to piece, and to conserve time in laying out successive duplicate workpieces, I have constructed a simple, accurate layout device whereby the position of any number of holes in a given workpiece may be marked on a number of duplicate workpieces so accurately that after the pieces are drilled or bored they may be placed one on top of the other and two or more suitable plug gages passed through the holes in several pieces without undue binding, which proves the accuracy of the layout of the holes.

It is, accordingly, one object of this invention to provide a layout device with which it is possible to lay out the location of a series of holes in a single workpiece or in duplicate workpieces whereby successive workpieces can be drilled accurately to predetermined dimensions.

It is another object of this invention to provide a layout device that is capable of repetitive location of a series of holes in successive duplicate workpieces in order that they may be drilled so accurately that the spacing between the holes in each workpiece will be the same, within extremely close limits.

It is still another object of this invention to provide a layout device having a removable plotting member or chart, on which the spacing of the holes may be indicated, means to illuminate the chart, and a magnifier whereby the distance between designated points on the chart can be exactly transferred to successive workpieces.

Further objects and advantages will appear from the detailed description in conjunction with the accompanying drawings in which:

Fig. 1 is a side elevation of the device partially in section.

Fig. 1a is a plan view of the viewing screen.

Fig. 2 is a plan view of Fig. 1.

Fig. 3 is an end taken on line 3—3 of Fig. 3, showing the plotting member holding means.

Fig. 4 is a plan view of a plotting chart.

Referring to Figs. 1 and 2, it will be seen that the device consists of a substantially hollow base 1, on which is mounted a member 2 which has a groove 3 on its upper surface and rails 4 at either side. A carriage 5, having anti-friction rollers 6, is mounted on the rails 4 for movement from front to rear of the base. The carriage 5 is provided with anti-friction guide rollers 7, Fig. 2, that fit in groove 3 of the member 2, to keep the carriage in correct position on the rails 4.

Suitably fastened to the carriage 5 are rails 8 on which anti-friction rollers 9, fastened to carriage 10, are mounted. The rails 8 are mounted transverse to the rails 4 so that the carriage 10 is capable of movement transverse to the movement of carriage 5. A groove 11 is provided in the top of the carriage 5 for the reception of anti-friction guide rollers 12, fastened to the bottom of carriage 10, which keeps the said carriage in correct position on the rails 8. The carriage 10 is provided with T slots 13 by means of which suitable work locating stops or positioning members 14 and 15 can be fastened.

The above construction and assembly of the tables 5 and 10 on the base make it possible to move the carriage 10 universally in all directions, as will presently be explained, with the minimum amount of exertion.

A guard 16 is fastened to the carriage 10 which is large enough to keep the ways or rails covered so as to prevent dirt or particles of metal from getting thereon, regardless of the position of the tables. The operator controls the movement of the tables by means of said guard; although handles could be fastened to said guard if found to be desirable. At the front of the guard is a boss 17 which is screw-threaded at 18 to receive the screw-threaded section 19 of a magnifying viewer 20. The viewer per se can be purchased from any commercial dealer in optical instruments and need not be further described other than to say that it is adjustable and consists of a magnifying lens 21 and a viewing screen 22, having crossed hair lines 23 as shown in Fig. 1a.

At the front end of the base 1 is an aperture 24, Fig. 1, along the sides of which is mounted a pair of guides 25 and 26, Figs. 1, 2 and 3, fastened on blocks 27 and having grooves 28 to receive a transparent plotting chart 29 with opaque coordinate lines 30. As shown in Fig. 2, the opaque coordinates are rectangular but they may be angular lines or as shown in Fig. 4, the chart 31 may have a series of circles 32 divided by radial lines 33. In fact the plotting chart may have any combination or type of coordinates necessary to carry out the purpose of this device.

It has been found that by having a source of light which is stationary relative to the plotting chart that the light rays lose their intensity the farther away from the source the viewer is moved over the chart, and therefore the points of intersection of the coordinates are not clearly defined. This condition reduces the accuracy of the device, and in order that the coordinates may be sharply defined at all times, and their intersections accurately located, the arrangement described below has proven extremely efficient.

On the front of the guard 16 is suitably fastened a member 34 which is provided with a slot 35 and a projection 36 in which is mounted an electric light 38 which receives its power from any suitable source of power by means of wires 39. The center of the light is located directly in line with the point of intersection of the hair lines 23 on the screen 22 of the viewer 20.

Fastened to the guard 16 is a band 40 which extends from one side of the guard to the other side and under the member 2 for purposes that will presently be explained. A member 41 having a cylindrical bore 42, a shoulder 43, a smaller bore 44 and an aperture 45 is suitably fastened to the top of the base 1. Within the bore 42 is slidably mounted a member 46 having a reduced portion 47 which extends through the smaller bore 44 and aperture 45. A spring 48 in the smaller bore 44 surrounds the reduced portion 47 and presses against the member 46 to hold the said member firmly against the band 40 to automatically lock the tables in adjusted position.

A member 49, pivotally mounted at 50 to the reduced portion 47, is connected, by means of a rod 51 to a member 52 which is pivoted at 53 to a bar 54. The bar 54 is rotatably mounted on a shaft 55 which is supported in a hub 56, Fig. 2, that is located on a partition 57 in the base 1. The bar 54 extends through an aperture 58 in the base 1 and has a member 59 suitably fastened thereto. The member 59 is accessible for foot operation by the operator inasmuch as the base 1 has a recess 60 in the front. When the operator unlocks the table by stepping on the member 59, it is necessary to have a little drag or friction on the tables for the purpose of adjusting the rate of movement of the tables when they are unlocked to suit the touch of the operator and also to keep the movement of the tables steady so that they can be positioned accurately. In order to provide the necessary friction, a cylindrical plug 61 is slidably mounted in a bore 62 in the member 46, said plug being held against the band 40, by means of a spring 63, at all times.

Referring now to Fig. 1, the base 1 is provided with a column 64 having a finished pad 65 on which is mounted a head 66. In some installations the column will not be required and as the device can be readily made without the column it will be left off so that the base 1 can be installed in position near a drill press where the device will function perfectly. The head 66 represents a drill head having a reciprocable sleeve 67 within which is rotatably journaled a shaft 68, said shaft being rotated from any suitable source of power, not shown, such as a motor on the upper end of the shaft 68. The sleeve 66 is moved up and down by means of a rack and gear, not shown, said gear being rotated by the movement of a handle 69. On the bottom of the shaft 68 is a commercial drill chuck 70 having a drill 71 therein.

While I have shown a drill which needs rotation to be effective, I may substitute a commercial, automatic prick punch for the drill and in that case it would not be necessary to provide rotation as only a straight line motion would be required to cause the automatic prick punch to operate upon coming into contact with the work piece.

In order to operate this device the operator will be given a plotting chart on which the location of the holes have been laid out by the engineering department with connecting lines from hole to hole to aid in moving the viewer rapidly from point to point. The operator now places the chart 29 in the ways 28 and locates the workpiece 72 on the table 10 by means of adjustable stops 14 and 15, and turns on the light 38.

The operator releases the tables 5 and 10 by stepping on the member 59 which draws the brake member 46 down against the shoulder 43 in the member 41 and away from the band 40. He now moves the tables by means of the guard 16 in the necessary directions until he sees the hole locating point on the screen 22 directly at the intersection of the crossed hairs 23. Inasmuch as the magnifier greatly enlarges the chart on the screen, in the present instance 20 to 1, the center of the mark on the chart can be ascertained within extremely close limits, that is to say, within .0001" of being exact.

As soon as the center of the mark on the plotting chart is directly under the intersection of the hair lines, the operator removes his foot from the member 59 and the spring 48 presses the member 46 against the band 40 thereby automatically locking the tables in position. He now lowers the drill or prick punch by means of the handle 69 and spots the work. This is repeated until all of the points on the chart have been viewed and the workpiece suitably spotted for drilling, after which the workpiece is removed and a new workpiece is placed on the table and the operation is repeated.

From the above explanation, it will be noticed that I have perfected a layout or marking device for workpieces which is simple in construction, extremely accurate in operation and easy to operate.

I claim:

1. In a device of the class described, a base, a pair of superposed carriages mounted on said base, and movable in transverse directions, a removable plotting chart mounted on said base, means on the top carriage for magnifying a portion of said plotting chart, means to illuminate the portion of the plotting chart to be magnified, means for moving said top carriage and magnifying means whereby any portion of the chart may be viewed and means normally locking the carriages in viewing position.

2. In a device of the class described, a base, ways on the base, a carriage on said ways, ways on said carriage, a carriage on said second ways, a guard fastened to the second carriage, a band fastened to said guard passing under the first carriage, and spring pressed means contacting said band to lock both carriages in any position.

3. In a device of the class described, a base, ways on the base, a carriage on said ways, ways on said carriage, a carriage on said second ways, a guard fastened to the second carriage, a band fastened to said guard passing under the first carriage, spring pressed means contacting said band to lock both carriages in any position, and a foot actuated means to actuate said last named means to unlock said carriages.

4. In a device of the class described, a base, a pair of carriages mounted on said base for movement relative thereto, one of said carriages moving transverse to the movement of the other carriage, a plotting chart having coordinates with designated points marked thereon, means to illuminate said chart, means to magnify a portion of said chart a screen on which said magnification can be seen, means to move said carriages, illuminating means and magnifying means simultaneously, and means normally locking said carriages in any desired position.

5. In a device of the class described, a base, a pair of carriages mounted on said base for movement relative thereto, one of said carriages being on the other and moving transverse to the movement thereof, a plotting chart having coordinates with designated points marked thereon, means to illuminate said chart, means to magnify a portion of said chart and including a screen on which said magnification can be seen, said illuminating and magnifying means and said screen all being on the one carriage, means to move said one carriage, illuminating means and magnifying means simultaneously and together, means to lock said last three means in any desired position, means to unlock said last named three means, and means normally maintaining the locking means in locking condition.

6. In a device of the class described, a base, a pair of carriages mounted on said base for movement relative thereto, one of said carriages being on the other carriage and moving transverse thereto, a plotting chart having coordinates thereon, means to illuminate said chart, means to magnify any one of said points as selected, a screen on which said magnification can be seen, said illuminating and magnifying means and said screen all being on the one carriage, means to move said carriages, illuminating means and magnifying means simultaneously, and means to lock said last three means in selected position.

7. In a device of the class described, a base, ways on the base, a carriage on said ways, ways on said carriage, a carriage on said second ways, a guard on the second named carriage, of said carriages, a band fastened to said guard passing under the first carriage, spring pressed means contacting said band to lock both carriages in any position, mechanical means to prevent free movement of the carriages when unlocked, and foot actuated means to actuate the spring pressed means to unlock said carriages.

8. A machine of the class described comprising a base, a reciprocatable tool arranged in fixed position on the base, a reciprocable carriage on the base under the tool, a carriage on the first carriage reciprocable at right angles thereto, a removable chart on the base, a guard covering the first carriage and chart and mounted on the second carriage, an eye piece on the guard for viewing the chart, means to move the guard, eye-piece and carriages to align the tool with the second carriage as determined by the eye-piece and chart, means normally locking the carriages simultaneously, and means to selectively inactivate said last named means.

WILLIAM D. SCHMIDT.

REFERENCES CITED

The following references are of record in the file of this patent:

UNITED STATES PATENTS

| Number | Name | Date |
|---|---|---|
| 1,010,657 | Mason | Dec. 5, 1911 |
| 1,397,771 | Mort | Nov. 22, 1921 |
| 1,424,941 | Pirwitz | Aug. 8, 1922 |
| 2,044,070 | Ewaldson et al. | June 16, 1936 |
| 2,109,849 | Price | Mar. 1, 1938 |
| 2,110,958 | Linder | Mar. 15, 1938 |
| 2,268,293 | Lundeberg | Dec. 30, 1941 |